March 2, 1943.                T. M. ALLEN                 2,312,615
                         BEARING ASSEMBLY MEANS
              Filed Nov. 15, 1939            2 Sheets-Sheet 1

INVENTOR
BY Thomas M. Allen
Walter E. Schirmer
ATTORNEYS

March 2, 1943. T. M. ALLEN 2,312,615
BEARING ASSEMBLY MEANS
Filed Nov. 15, 1939 2 Sheets-Sheet 2

INVENTOR
BY Thomas M. Allen
Walter E. Schirmer
ATTORNEYS

Patented Mar. 2, 1943

2,312,615

UNITED STATES PATENT OFFICE 2,312,615

BEARING ASSEMBLY MEANS

Thomas M. Allen, South Bend, Ind., assignor to Bantam Bearings Corporation, South Bend, Ind., a corporation of Indiana Application November 15, 1939, Serial No. 304,462

7 Claims. (Cl. 206—46)

This invention relates to bearing assembly means, and more particularly is directed to means for assembling full complement bearings of the roller or needle type into bearing races or openings in shafts, journals, or similar bearing assemblies in which the full complement set of rollers is to be disposed to receive an inner race member or shaft adapted to be rotatably journalled therein.

It is obvious that when the bore of a gear or outer race of a bearing assembly is to be filled with needle roller bearings prior to assembly of a shaft or inner race member therein, it is difficult if not impossible to hold the bearings in position if they are assembled individually. Intricate machinery has been developed to secure this result, but I have found a very satisfactory solution to the problem which is very economical and inexpensive and fully serves the purpose insofar as assembly of full complement type bearings into an outer race is concerned.

The fundamental concept of the present invention is to provide the cheapest possible construction that can be utilized for holding the full complement of bearings in proper position for insertion into the gear or outer race, and which is capable of being discarded without any appreciable loss after use.

One of the primary objects of the present invention is to provide a container of cylindrical form into which the full complement of bearings is disposed in friction engagement, with means provided so that as the container is lined up with the bore, all of the needles can be simultaneously moved outwardly of the container into the bore without displacement from their keystoned relationship, leaving the container sleeve on the outside of the bore where it can be readily discarded.

Still another object of the present invention is to provide, in conjunction with such a container or sleeve, an inner sleeve member which may be utilized for moving the needles as a unit into the bore so that there will be no possibility of destroying their keystoned relationship as they are moved into the bore. Still another feature of the invention is the provision of a design adapted for use when a multitude of gears or the like is provided into which such full complement type bearings must be inserted, comprising the use of a plunger upon which a plurality of such assemblies are disposed and which is provided with means allowing the successive displacement of the assemblies into the successive bores in such a manner as to greatly reduce the time involved in making such a plurality of assemblies.

Other objects and advantages of the present invention will appear more fully from the following detailed description which, taken in conjunction with the accompanying drawings, will disclose to those skilled in the art the particular construction and operation of a preferred form of the present invention.

Figure 1:
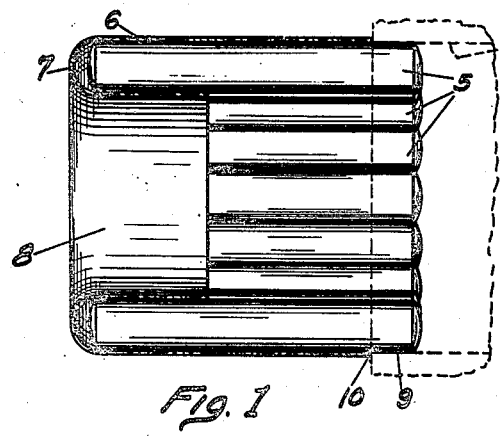
Figure 1 is a sectional view through one form of needle bearing assembly and container.
Figure 2:
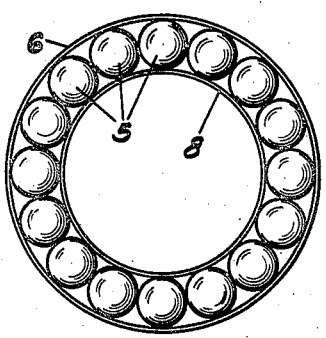
Figure 2 is an end elevational view of the structure shown in Figure 1.

Referring now in detail to Figures 1 and 2, in Figure 1 I show a full complement bearing assembly comprising the roller elements 5 which are arranged in keystoned relation and enclosed by a container sleeve 6 which radially encloses the bearings in frictional engagement so as to retain them in keystoned relation, and which has an intermediate portion 7 rolled around one end of the bearing assembly and terminating in a cylindrical portion 8 of smaller diameter which fits in the end of the assembly for a purpose to be described hereinafter.

In assembling a structure such as shown in Figure 1, the free end portions 9 of the roller members are located within the bore of a gear sleeve member or the like, indicated diagrammatically at 11, in their keystoned relationship. Having once been centered in this position, the portion 8 of the enclosing sleeve is worked inwardly which tensions the curved portion 7 over the opposite ends of the roller members 5 and forces the same inwardly, moving them as a unit into the bore 11 inasmuch as the defining edge 10 of the sleeve member 6 is butted against the radial face of the bore and does not move inwardly. As a result, the rollers are moved simultaneously in keystoned relationship into the bore 11 without in any way shifting them relative to each other so that as they are finally worked into position, the paper sleeve 6, which may be formed of cardboard or similar stock, is completely stripped from the external surface of the bearings and they are disposed within the bore in their proper keystoned relationship.

Figure 3:
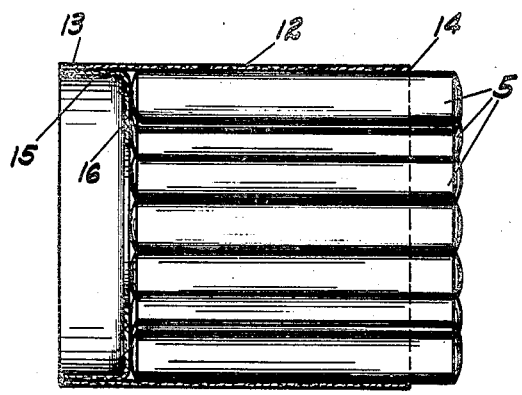
Figure 3 shows a modified form of assembly incorporating a pusher ring.
Figure 4:
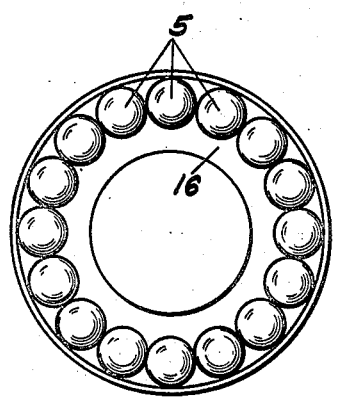
Figure 4 is an end elevational view of the structure shown in Figure 3.

In the construction shown in Figure 3 an outer cylindrical sleeve 12 is provided which radially encircles the rollers 5 overhanging the same at one end as indicated at 13 and terminating short of the opposite end of the rollers 5 as indicated at 14. The sleeve 12 may be made of relatively stiff cardboard which is capable of retaining its shape, and which frictionally engages the rollers and maintains them in keystoned relationship against relative displacement. Disposed within and closely fitting the overhanging end 13 of the sleeve 12 is a pusher member 15 having the cylindrical portion sliding within the sleeve 12 and having the radially inwardly flanged portion 16 engaging the enclosed end of the rollers. When the extending ends of the rollers 5 are located within a bore, such as the bore 11, with the end 14 of the sleeve member 12 moved into abutment with the defining edge of the bore, the pusher ring 15 is moved axially through the sleeve 12, thereby effecting simultaneous movement of all of the roller members in keystoned relationship into the bore. As the flange 16 approaches the end 14 of the sleeve member 12, it will be seen that the rollers have been displaced entirely out of the sleeve member, and consequently have been moved into fully engaged position within the bore without disturbing in any manner their keystoned relationship. This provides the distinct advantage of a positive means of pushing the rollers simultaneously and uniformly into the bore without in any way disturbing their relative relationship either axially or radially.

Figure 5:
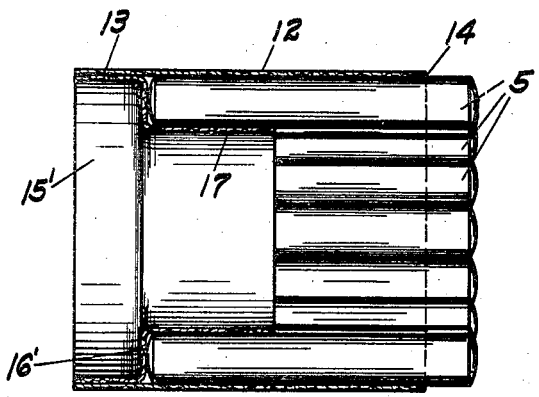
Figure 5 is a view corresponding to Figure 3 of a slightly modified form employing the pusher ring principle.
Figure 6:
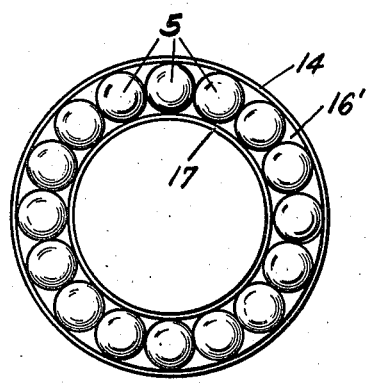
Figure 6 is an end elevational view of the structure shown in Figure 5.

In Figure 5 I have disclosed a slightly modified form of construction in which the sleeve member 12 has disposed therein a pusher member 15' which includes, in addition to the flange portion 16', an inner sleeve portion 17. In this form of the invention the same action is employed to move the rollers into the bore, but the sleeve portion 17 serves as an additional retaining means for preventing any possible dislocation of the needle rollers relative to each other, and insures that the rollers will be maintained in proper keystoned relation as the sleeve 12 is stripped therefrom, inasmuch as the pusher member 15' can be moved into the bore beyond the end 14 of the sleeve member 12 to insure proper axial locating of the rollers in the bore if the bore is of greater axial extent than the length of the rollers and the member 15' can then be withdrawn after the rollers have been positioned properly within the bore without in any way disturbing the keystoned relationship of the rollers.

Figure 7:
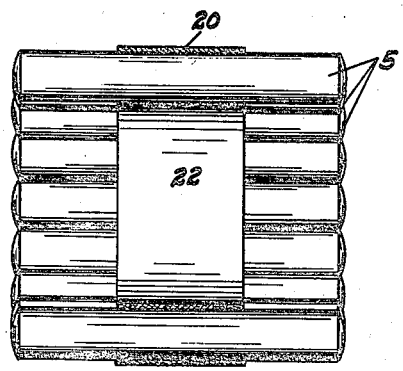
Figure 7 is a sectional elevational view of a very cheap construction, which facilitates the shipment of such bearings in fully assembled keystoned relation.
Figure 8:
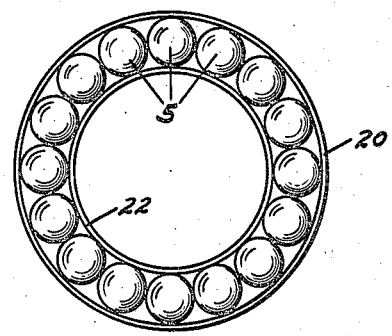
Figure 8 is an end view of the structure shown in Figure 7.

In Figure 7 I have provided a very cheap construction incorporating the use of an external annular sleeve 20 and an internal sleeve 22 of substantially equal axial extent, forming therebetween an annular gap in which the rollers 5 are positioned in keystoned relationship. With such a construction the rollers 5 may be located in the open end of the bore, and suitable means may be employed engaging the opposite ends of the rollers to push them into the bore, thereby stripping the sleeve 20 therefrom. If the inner race member comprises a shaft or the like which is adapted to extend through the bore, upon pushing it through the opening between the roller members it will automatically strip the inner sleeve 22 therefrom so that the rollers are maintained in keystoned relation until such time as the inner and outer races of the bearing assembly are in position.

Similarly, with such a construction the bearings can be inserted over a shaft or the like constituting an inner race surface, and while being so positioned, the defining edge of the shaft surface will strip the inner sleeve 22 from within the bearings but will allow the encircling sleeve 20 to remain in position and this sleeve will not be removed until the outer race member is slid over the outer surfaces of the bearings to lock the bearings between the two races. The construction shown in Figure 7 is also admirably suited for use in the shipment of bearings, providing the sleeves 20 and 22 are made out of sufficiently rigid stock so as to prevent their deformation, which might result in disturbing the keystoned relation on the rollers. Heavy cardboard stock, or even light wood sleeves, may be employed for this purpose.

Figure 9:
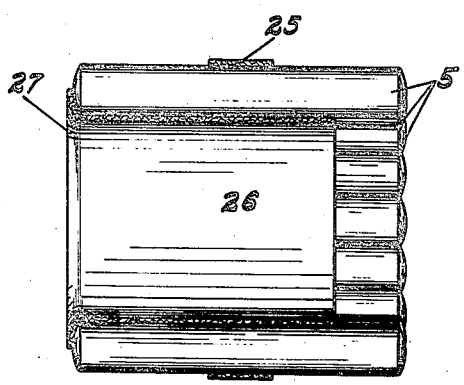
Figure 9 shows a combination of the construction shown in Figures 5 and 7 to incorporate the pusher ring feature therein.
Figure 10:
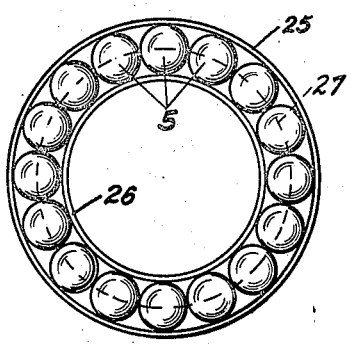
Figure 10 is an end elevational view of the structure shown in Figure 9.

Figure 9 constitutes a modification of the structure shown in Figure 7, and includes the outer sleeve member 25 and an inner sleeve member 26, which inner sleeve member is of appreciable axial extent and terminates in the radially out-turned flange 27 engaging the ends of the rollers 5. With this construction, the rollers can be moved either into an internal bore in a rotatably mounted member or over a shaft surface similar to the manner in which the rollers of Figure 7 may be assembled on a bearing surface. However, the sleeve 26 provides through the medium of the flange 27, means for effecting simultaneous axial movement of all of the rollers to insure that there will be no disturbing of their relative radial or axial positions during the assembly within or onto the bearing surface. This structure also has the advantage of providing a cylindrical support for the roller members for an appreciable portion of their axial extent, thereby eliminating any tendency of the rollers to tip relative to each other, which might disturb the keystoned relationship.

Figure 11:
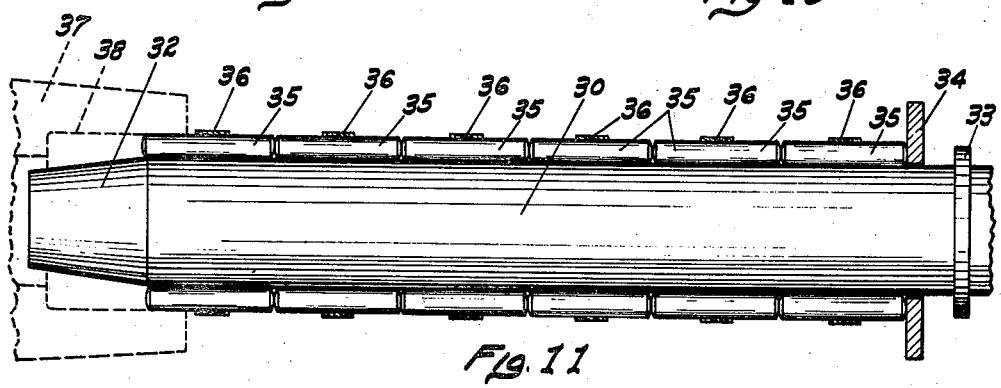
Figure 11 is a somewhat diagrammatic view showing the manner in which a plurality of assemblies can be carried on a spindle and progressively moved into the outer race or bore without any handling on the part of the operator.

In Figure 11, I have disclosed a novel means for assembling such rollers into position in a plurality of gears. In this form of the invention, a spindle 30 is provided having the tapered end 32 and having at its opposite end a fixed sleeve or collar 33 and a movable disc 34 closely embracing the annular surface of the sleeve.

Mounted on the sleeve intermediate the tapered end 32 and the disc 34 are a plurality of roller assemblies 35, each of which includes an outer container sleeve or retaining means 36 similar to the sleeve 20 of Figure 7 whereby the rollers are retained in keystoned position, and may be rather loosely disposed upon the spindle 30.

In mass production operations, there may be a multitude of gears or the like, indicated diagrammatically at 37, having shouldered bores 38 adapted to receive roller assemblies such as indicated at 35. The operator therefore takes the spindle 30 with the roller assemblies thereon and inserts the tapered end 32 into the bore 38 a sufficient distance so that an appreciable amount of the end of the foremost roller assembly is guided into the open end of the bore 38. The operator then holds the spindle in position and presses the disc 34 forwardly shoving the foremost roller assembly 35 into the bore and simultaneously stripping the retainer 36 of this roller assembly therefrom as the rollers move into the bore. This locates the roller assembly in the bore in keystoned relationship, and since the rollers at this time are disposed adjacent the tapered end 32 of the spindle, the spindle can be readily withdrawn and inserted into the next gear or similar member 37 when the same operation is repeated and the next roller assembly inserted into the corresponding bore of the second member. This operation can be repeated until all of the roller assemblies on the spindle have been located in the bores in this manner, and it will be apparent that this greatly facilitates the position of such assemblies in bores of this type without requiring the operator to handle the assemblies independently and without in any way disturbing their keystoned relationship as they are placed in the bores.

It is therefore believed apparent that I have provided novel means for introducing full complement type bearing assemblies into bores of gears or sleeves, or onto shaft surfaces, which is very cheap in construction and materially facilitates the positioning of such bearing assemblies without disturbing the keystoned relation thereof.

I am aware that various changes may be made in certain of the details of the present construction without in any way departing from the underlying principles thereof, and I therefore do not intend to be limited except as defined by the scope and spirit of the appended claims.

I claim:

1. The combination, with a full complement roller bearing assembly, of means for maintaining said rollers in assembled relationship, comprising an outer sleeve member encircling said rollers and maintaining them in keystoned relation, and a pusher sleeve member disposed radially within said assembly and having a radial flange abutting axially against the roller ends for moving said rollers axially relative to said outer sleeve member.

2. Means for inserting a full complement roller bearing assembly into a bore comprising an outer sleeve member encircling the bearing assembly and of less axial length than said assembly, an inner sleeve member within said rollers, said inner member having a radially extending shoulder abutting one end of said rollers for moving said rollers axially outwardly of said outer sleeve member.

3. The combination, with a roller bearing assembly of the full complement type, of means for maintaining said assembly in keystoned relationship comprising an outer cylindrical sleeve encircling said assembly and holding it in said keystoned relationship, and means having endwise engagement with said rollers for conjointly shifting the rollers axially relative to said sleeve, said last-named means including an inner sleeve portion disposed within the assembly and supporting the rollers against radial inward movement.

4. In combination, a full complement roller bearing assembly, a cylindrical fiber sleeve extending axially thereover and terminating short of one end of the rollers, a fiber pusher member having a thin radial flange axially abutting the opposite ends of said rollers whereby, upon insertion of said one end of said assembly into a bore with said outer sleeve edge abutting the bore face said pusher member can be shifted axially to move said rollers conjointly through said sleeve to said bore, said pusher member having an extending reduced cylindrical flange within said assembly holding said rollers against radial inward displacement.

5. The combination, with a full complement roller bearing assembly, of an outer cylindrical fiber sleeve radially embracing said assembly to maintain said rollers in keystoned relationship, an inner cylindrical fiber sleeve within said assembly supporting said rollers against radial inward displacement, said sleeves terminating short of said roller ends at one end of said assembly and so constructed and arranged that as said one end of said assembly is inserted into position relative to a raceway, one of said sleeves is stripped axially therefrom, the other of said sleeves having a radial flange extending over one end of said rollers to act as a pusher member for said assembly.

6. The combination, with a full complement roller bearing assembly, of an outer cylindrical fiber sleeve radially embracing said assembly to maintain said rollers in keystoned relationship, an inner cylindrical fiber sleeve within said assembly supporting said rollers against radial inward displacement, said sleeves terminating short of said roller ends at one end of said assembly and so constructed and arranged that as said one end of said assembly is inserted into a bearing race said outer sleeve is axially stripped therefrom while said inner sleeve retains said rollers in keystoned relation, said inner sleeve having an outwardly directed radial flange engaging the ends of said rollers at the opposite end of said assembly to act as a pusher means.

7. The combination, with a full complement roller bearing assembly, of an outer fiber sleeve encircling said rollers to maintain the same in keystoned relation, an inner fiber sleeve within the assembly holding said rollers against radial inward displacement, and a radially directed flange on said inner sleeve engaging one end of said rollers for conjointly moving the same axially.

THOMAS M. ALLEN.